(12) United States Patent
Siegel et al.

(10) Patent No.: US 9,849,739 B2
(45) Date of Patent: Dec. 26, 2017

(54) HITCH MOUNT ASSEMBLY

(71) Applicant: CEQUENT CONSUMER PRODUCTS, INC., Solon, OH (US)

(72) Inventors: Theodore Joseph Siegel, Mayfield Heights, OH (US); Eric Michael Yukich, Stow, OH (US); Laurie Michelle Heiser, Sagamore Hills, OH (US); Michael Allen Maurer, Euclid, OH (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 15/099,915

(22) Filed: Apr. 15, 2016

(65) Prior Publication Data

US 2016/0303931 A1     Oct. 20, 2016

Related U.S. Application Data (60) Provisional application No. 62/147,939, filed on Apr. 15, 2015, provisional application No. 62/170,954, filed on Jun. 4, 2015.

(51) Int. Cl.
| | | |
|---|---|---|
| *B60D 1/06* | (2006.01) | |
| *B60D 1/58* | (2006.01) | |
| *B60R 3/04* | (2006.01) | |

(52) U.S. Cl.
CPC ............... *B60D 1/06* (2013.01); *B60D 1/58* (2013.01); *B60R 3/04* (2013.01)

(58) Field of Classification Search
CPC ..................................... B60D 1/58; B60R 3/04
See application file for complete search history.

(56) References Cited

U.S. PATENT DOCUMENTS

| | | | |
|---|---|---|---|
| 4,412,635 A | 11/1983 | Bateman | |
| 5,043,536 A | 8/1991 | DeBartolo, Jr. | |
| 6,145,861 A | 11/2000 | Willis | |
| 6,363,567 B1 * | 4/2002 | Woodward | A46B 7/023 |
| | | | 15/161 |
| 6,491,315 B2 | 12/2002 | Hagen et al. | |
| 6,511,086 B2 | 1/2003 | Schlicht | |
| 6,554,311 B1 | 4/2003 | Blankenship et al. | |

(Continued)

FOREIGN PATENT DOCUMENTS

WO     2010128195     11/2010

OTHER PUBLICATIONS

International Search Report and the Written Opinion of the International Searching Authority, Cequent Consumer Products, Inc. Jul. 11, 2013.

*Primary Examiner* — Kevin Hurley
(74) *Attorney, Agent, or Firm* — McDonald Hopkins LLC (57) ABSTRACT

A hitch mount assembly selectively securable to a hitch ball receiver is shown and described. The hitch mount assembly may include a mount body operatively engaged with an underside portion of the hitch ball receiver, where the mount body has an attachment feature to be selectively secured to an article such as a brush, and a clamp body selectively secured to the mount body and positioned on a top portion of the hitch ball receiver. The hitch mount assembly may also include at least one fastener selectively securing the clamp body to the mount body with the hitch ball receiver positioned between the clamp body and the mount body.

19 Claims, 12 Drawing Sheets

(56) References Cited

U.S. PATENT DOCUMENTS

| | | | |
|---|---|---|---|
| 6,682,086 B1 | 1/2004 | Erickson | |
| 6,769,704 B2 | 8/2004 | Cipolla | |
| D511,319 S | 11/2005 | Wang | |
| 7,185,904 B1 | 3/2007 | Jones et al. | |
| 7,234,191 B2 * | 6/2007 | Finley | B60R 3/04 |
| | | | 15/112 |
| 7,347,597 B2 | 3/2008 | French | |
| 7,363,677 B1 * | 4/2008 | Owens | A46B 5/0033 |
| | | | 15/161 |
| 7,419,177 B2 | 9/2008 | Kottke et al. | |
| 7,661,694 B2 | 2/2010 | Krespach et al. | |
| D723,984 S | 3/2015 | Anderson | |
| 2004/0207224 A1 | 10/2004 | Miller et al. | |
| 2005/0040623 A1 | 2/2005 | Krespach et al. | |
| 2005/0286257 A1 | 12/2005 | Trimmer et al. | |
| 2006/0091637 A1 | 5/2006 | Knittel | |
| 2009/0045604 A1 | 2/2009 | Bernart | |
| 2011/0167688 A1 | 7/2011 | Frost | |
| 2013/0093163 A1 | 4/2013 | Bernart | |
| 2013/0270791 A1 * | 10/2013 | Anderson | B60R 3/007 |
| | | | 280/163 |

\* cited by examiner

HITCH MOUNT ASSEMBLY

CROSS REFERENCE TO RELATED APPLICATIONS

This application claims the benefit of U.S. Provisional Patent Application No. 62/147,939, entitled "Hitch Mount Assembly" filed on Apr. 15, 2015 and claims the benefit of U.S. Provisional Patent Application No. 62/170,954, entitled "Hitch Mount Assembly" filed on Jun. 4, 2015, all of which are hereby incorporated by reference in their entirety.

FIELD OF INVENTION

The present invention generally relates to a hitch mount assembly, and more particularly to a hitch mount assembly selectively securable to a vehicle, the hitch mount assembly having an article such as a brush or other modular component selectively attached thereto.

BACKGROUND

Hitch assemblies are typically designed to be mounted to vehicles to allow the towing of towed vehicles such as trailers. Hitch assemblies are typically bolted directly to the towing vehicle's frame to attempt to generally distribute stress applied during operation over the vehicle frame. Some exemplary hitch assemblies include a central frame member or crossbar having mounting brackets connected at each end for mounting the hitch assembly to the frame of the towing vehicle. A receiver box having a rearwardly facing opening or cavity is often mounted to the crossbar for the receipt of a hitch or draw bar that carries a hitch ball or other means of allowing connection to a trailer.

Hitch assemblies are often attached to large vehicles, especially vehicles capable of towing large loads. Many of these vehicles are operated by individuals having commercial or industrial uses on a jobsite or other terrain. Further, many of these individuals may have to leave the vehicle for a period of time and traverse the jobsite or terrain on foot. In these cases, the individual may soil their footwear prior to having to return to the vehicle. Unless removed, the soiled footwear may accumulate within the vehicle or even be accumulated within that individual's office or home.

Therefore, there is a need to provide an accessory mountable on an exterior portion of a vehicle that is configured to assist an individual remove soil from his footwear. There is also a need for a hitch mount assembly that can mount various removable accessories thereon such as a brush or scraper. Additionally, there is a need to provide a hitch mount assembly that does not require the hitch ball to be removed to be attached and/or removed from the vehicle.

SUMMARY

A hitch mount assembly selectively securable to a hitch ball receiver is shown and described. The hitch mount assembly may include a mount body operatively engaged with an underside portion of the hitch ball receiver, where the mount body has an attachment feature to be selectively secured to an article such as a brush, and a clamp body selectively secured to the mount body and positioned on a top portion of the hitch ball receiver. The hitch mount assembly may also include at least one fastener selectively securing the clamp body to the mount body with the hitch ball receiver positioned between the clamp body and the mount body.

A hitch mount assembly selectively securable to a hitch ball receiver having a tongue may include a mount body capable of circumscribing at least a portion of the tongue, where the mount body has an attachment portion to be selectively secured to an article such as a brush or a scraper, and a clamp body selectively secured to the mount body and positioned over the tongue of the hitch ball receiver. The hitch mount assembly may also include at least one fastener selectively securing the clamp body to the mount body.

A hitch mount assembly selectively securable to a hitch ball receiver may include a mount body, a portion of which is positioned below the hitch ball receiver, where the mount body has an attachment feature that is selectively secured to an article that may be axially aligned with the hitch ball receiver. The hitch mount assembly may also include a clamp body secured to the mount body and positioned on a top portion of the hitch ball receiver, where the hitch ball receiver is clamped between the step body and mount body.

BRIEF DESCRIPTION OF THE DRAWINGS

Operation of the invention may be better understood by reference to the detailed description taken in connection with the following illustrations, wherein.

DETAILED DESCRIPTION

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined, switched, or altered without departing from the scope of the present teachings, e.g., features of each embodiment disclosed herein may be combined, switched, or replaced with features of the other embodiments disclosed herein. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

A hitch mount assembly 20 capable of being and configured to be selectively secured to a towing vehicle is shown in FIGS. 1-20. The hitch mount assembly 20 may be selectively secured to a hitch receiver or ball mount 30 secured to a hitch assembly of the towing vehicle as shown in FIGS. 5-8. The hitch assembly may be configured to facilitate attachment of the towing vehicle to a towed vehicle (not shown) of any configuration. The hitch assembly may attach to the towing vehicle frame (not shown) in proximity to a rear portion of the towing vehicle in any appropriate manner. The hitch assembly may be configured to receive or connect to the hitch ball receiver 30 in any appropriate manner. The hitch ball receiver 30 is shown for exemplary purposes and the present teachings are not limited to a specific receiver, but may apply to any configuration of hitch ball receiver.

The hitch ball receiver 30 may include a body 40 and a tongue 44 attached to one end of the body 40. The tongue 44 may be made from plate steel, and have a substantially tapered or L-shape but is not limited to such. The hitch ball receiver 30 may include a hitch ball mounting aperture in the tongue 44. A hitch ball 52 may have a threaded mounting shank and may be capable of being selectively secured to the hitch ball receiver 30 in any appropriate manner. A fastener 60 may be capable of engaging the shank to selectively secure the hitch ball 52 to the hitch ball receiver 30. In operation, a mounting shank of the hitch ball 52 may be aligned with and pushed through the hitch ball mounting aperture in the tongue 44 of the hitch ball receiver 30. The washers or other fasteners may be utilized to mount the mounting shank and the fastener 60 may then be tightened on the mounting shank. The hitch ball receiver 30 shown, however, is for exemplary purposes and the present teachings are not limited to a specific hitch ball receiver 30, but may apply to any appropriate hitch ball receiver. By way of a non-limiting example, the hitch ball receiver 30 may be as described in U.S. Pat. No. 7,661,694 and U.S. Patent Application No. 20130093163, which are both incorporated herein by reference.

The hitch mount assembly 20 may be selectively secured to the hitch ball receiver 30 in any appropriate manner. Moreover, the hitch mount assembly 20 may be selectively secured to the hitch ball receiver 30 while the hitch ball 52 remains secured to the hitch ball receiver 30. It may not, therefore, be necessary to remove the hitch ball 52 from the hitch ball receiver 30 to selectively secure the hitch mount assembly 20 to the hitch ball receiver 30. Accordingly, the hitch ball 52 may be secured to the hitch ball receiver 30 independent of the hitch mount assembly 20 being attached or not. The hitch ball 52 may be attached to the hitch ball receiver 30 and then the hitch mount assembly 20 may be selectively secured to the hitch ball receiver 30 or vice versa.

In some embodiments, the hitch mount assembly 20 may include a mount body 24 and a clamp body 28. The clamp body 28 may be considered a top clamp and be selectively attached to the mount body 24, as described below in more detail. The mount body 24 may be capable of generally circumscribing at least a portion of the tongue 44 of the hitch ball receiver 30. This may result in the mount body 24 being generally free from obstructing the hitch ball 52 and the fastener 60 and generally permitting engagement of the hitch ball receiver 30 with the appropriate towed vehicle. In other words, the hitch mount assembly 20, and more specifically, the mount body 24 and top clamp 28 may be attached to and/or removed from the hitch ball receiver 30 without generally interfering with operation of the hitch ball receiver 30. This may make it much more convenient to attach the hitch mount assembly 20.

Figure 9:
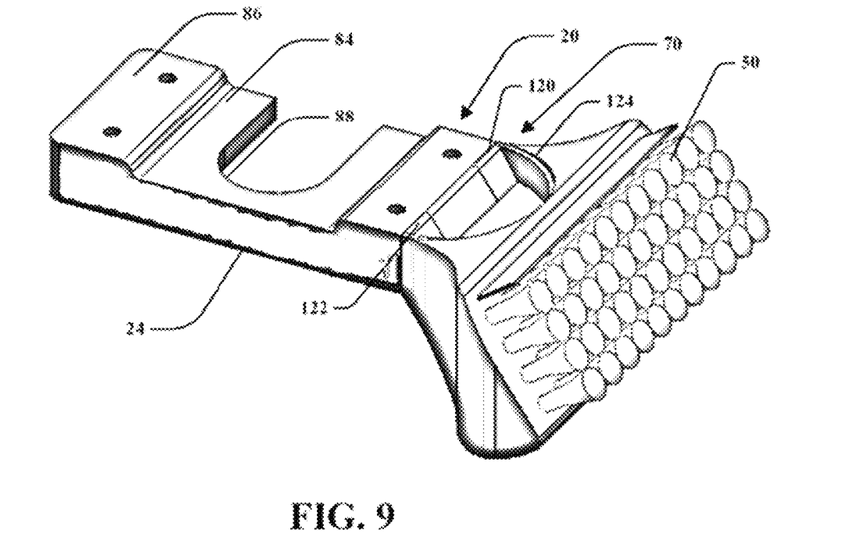
FIG. 9 is a perspective view of embodiments of a hitch mount assembly with the brush and without a clamp body in accordance with the instant disclosure.
Figure 10:
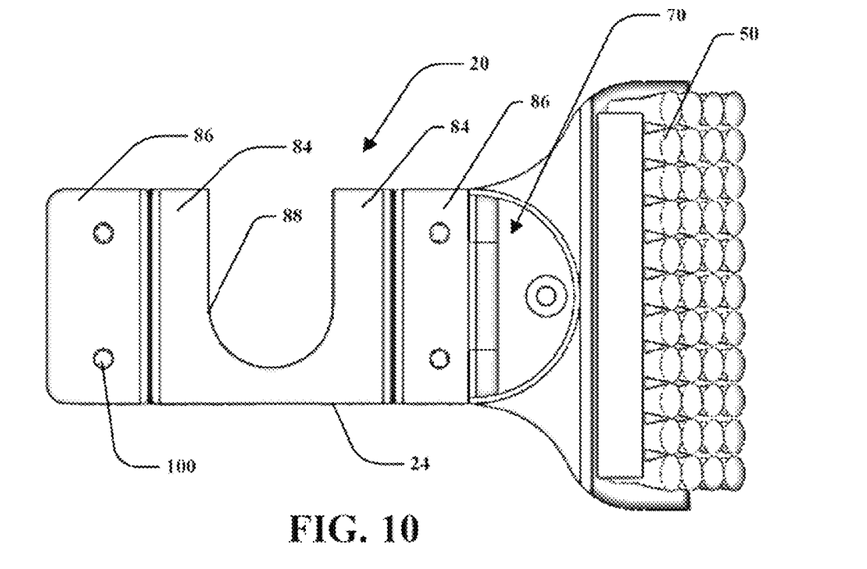
FIG. 10 is a top view the hitch mount assembly with the brush of FIG. 9.
Figure 11:
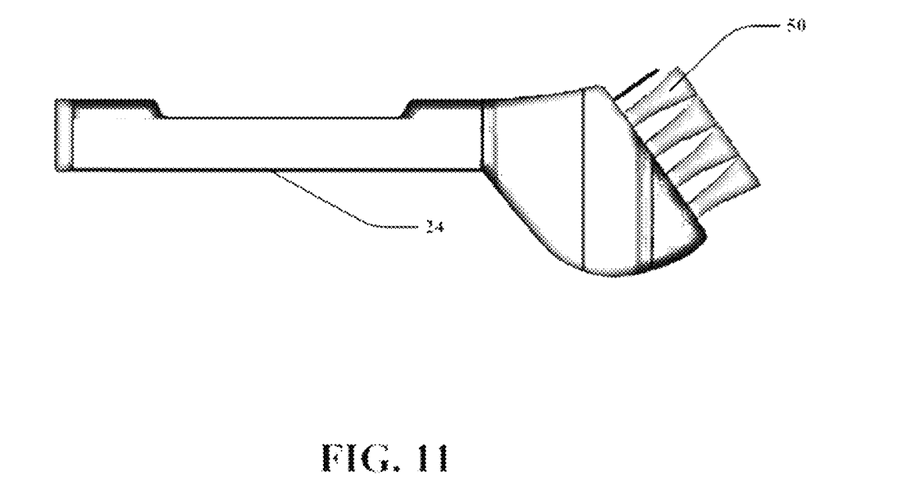
FIG. 11 is an front view the hitch mount assembly with the brush of FIG. 9.
Figure 12:
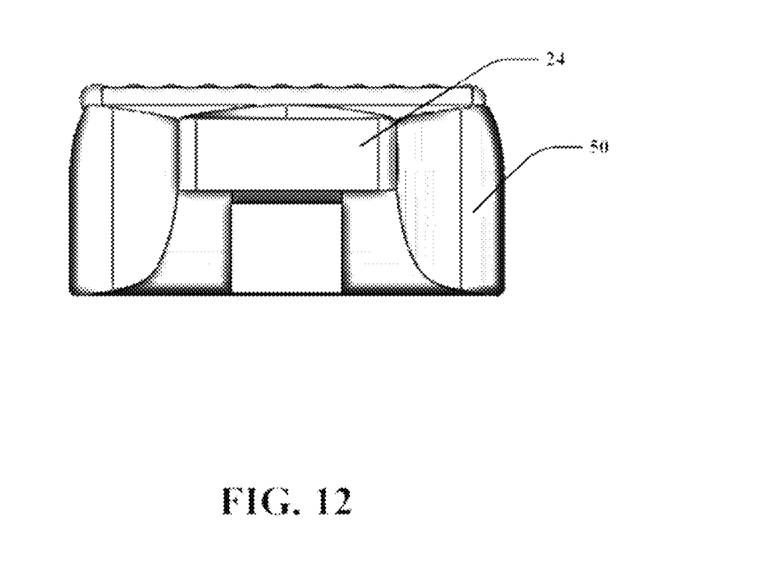
FIG. 12 is a first side view of the hitch mount assembly with the brush of FIG. 9.

In some embodiments, the mount body 24 may engage an underside 82 of the tongue 44 of the hitch ball receiver 30. By way of a non-limiting example, the mount body 24, as best seen in FIGS. 9 and 10, may include a first stepped portion 84 and a second stepped portion 86. The first stepped portion 84 may include a recess 88. The recess 88 may be shaped and sized such that when the mount body 24 engages with the hitch ball receiver 30 the mount body 24 may not otherwise obstruct the hitch ball receiver 30, the tongue 44, the hitch ball 52 and the fastener 60 and the operation thereof. This may generally allow operation of the hitch ball receiver 30 without the mount body 24 obstructing such. By way of a non-limiting example, a towed vehicle may be attached to the hitch ball receiver 30, or more specifically, the hitch ball 52, regardless of the mount body 24 being attached to the hitch ball receiver 30. Further, the hitch ball 52 may be removed from the hitch ball receiver 30 regardless of the mount body 24 being secured to the hitch ball receiver 30. Further still, the towed vehicle may be engaged with the hitch ball 52 and the hitch mount assembly 20 may be operatively secured with the hitch ball receiver 30.

In such embodiments, the first stepped portion 84 may engage or be positioned in proximity to the underside 82 of the tongue 44 of the hitch ball receiver 30 when the hitch mount assembly 20 is selectively secured to the hitch ball receiver 30, such as shown in FIGS. 5-8. This may permit use and operation of the hitch ball receiver 30 despite the hitch mount assembly 20 being selectively secured thereto.

Figure 15:
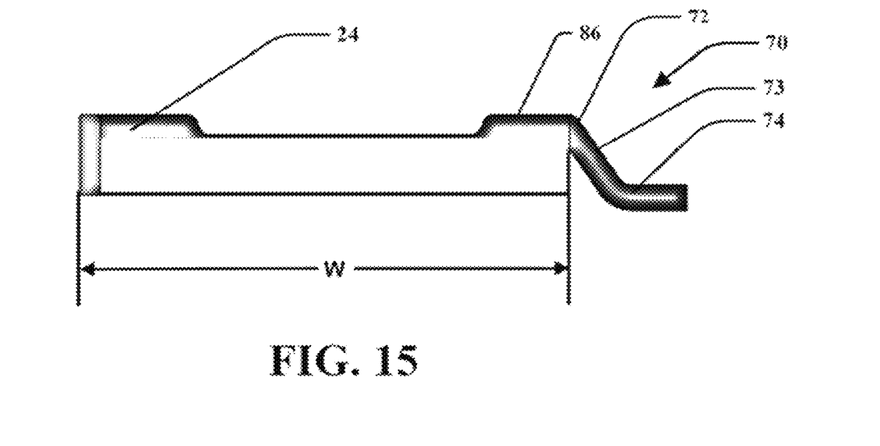
FIG. 15 is an front view the hitch mount assembly of FIG. 13.
Figure 16:
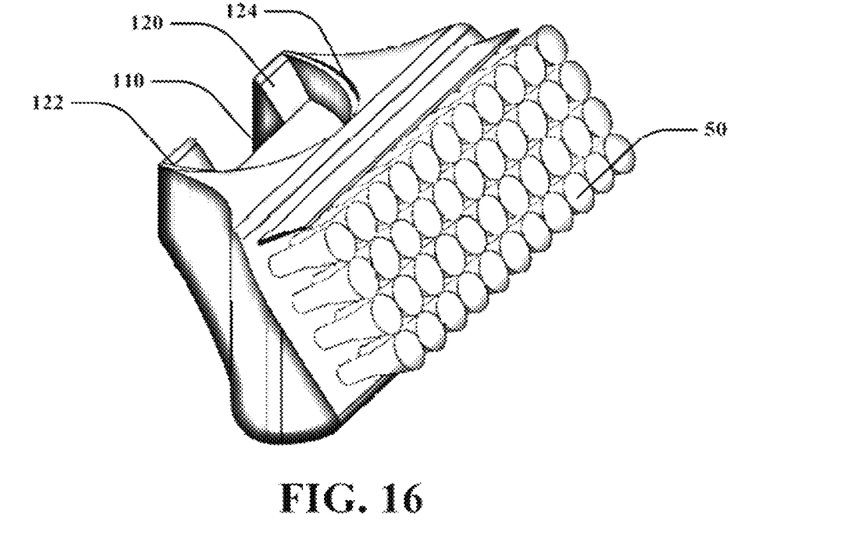
FIG. 16 is a perspective view of embodiments of a brush configured to be mounted to a hitch mount assembly in accordance with the instant disclosure.
Figure 17:
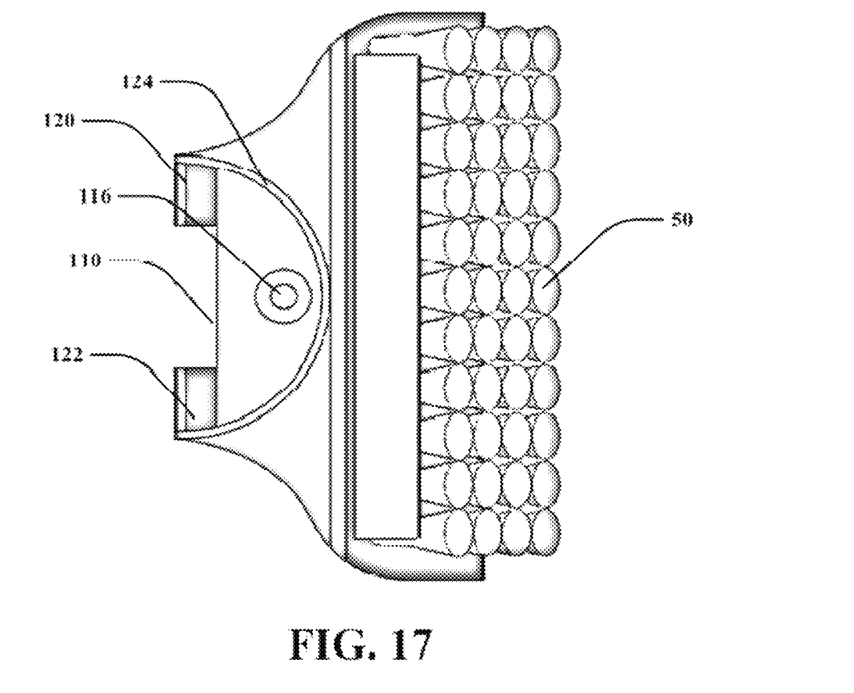
FIG. 17 is a top view the brush of FIG. 16.
Figure 18:
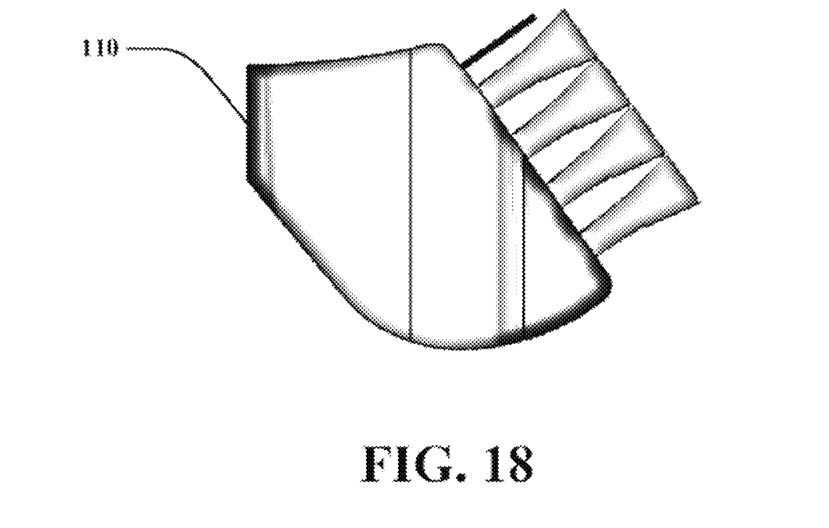
FIG. 18 is an front view the brush of FIG. 16.
Figure 19:
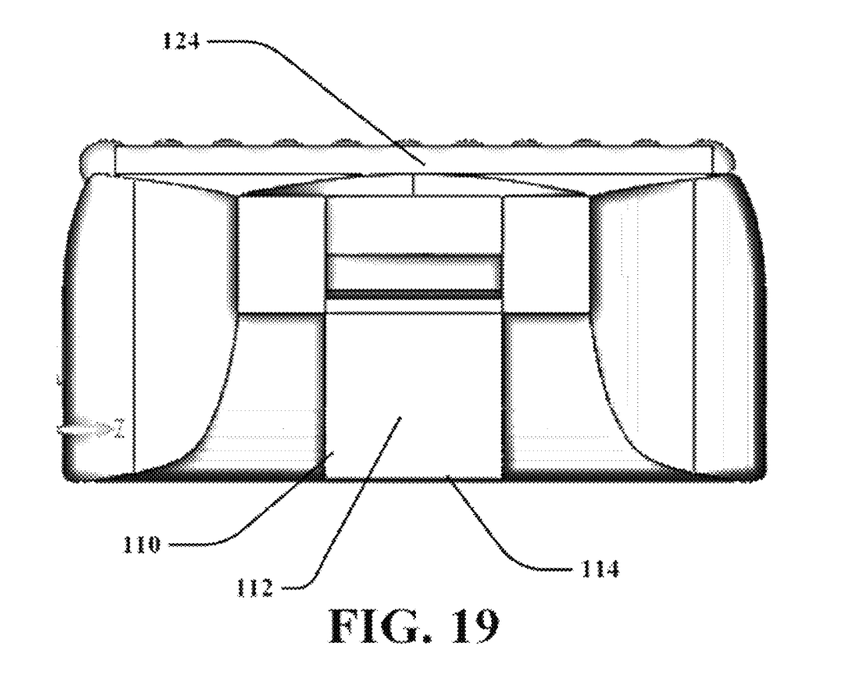
FIG. 19 is a first side view of the brush of FIG. 16.
Figure 20:
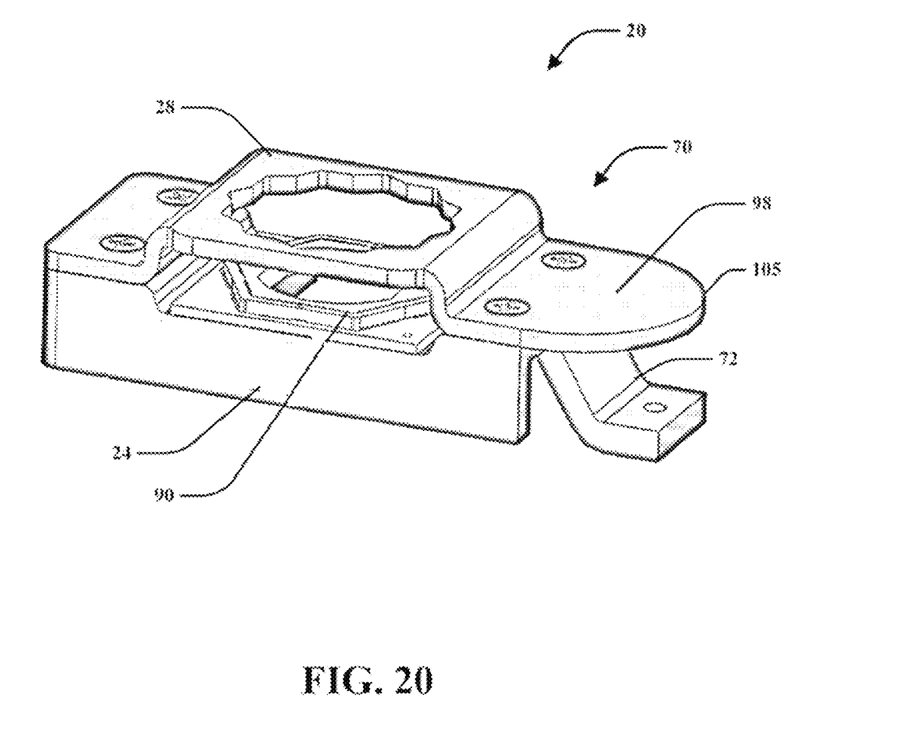
FIG. 20 is a perspective view of embodiments of a hitch mount assembly without an article mounted thereon in accordance with the instant disclosure.

Further, the mount body 24 may have a width W, as seen in FIG. 15. The width W of the mount body 24 may generally extend transversely from the hitch ball receiver 30 such that the mount body 24 may provide an attachment portion 70 to which one can selectively attach an article 50 thereto. In one embodiment, the article attached to the mount body is a brush 50 as shown in FIGS. 1-12 and 16-20. However, this disclosure is non-limiting in this regard, as the article 50 may also include various modular devices such as a platform, light fixture, scraper, reflector or other device or tool assembly.

Figure 5:
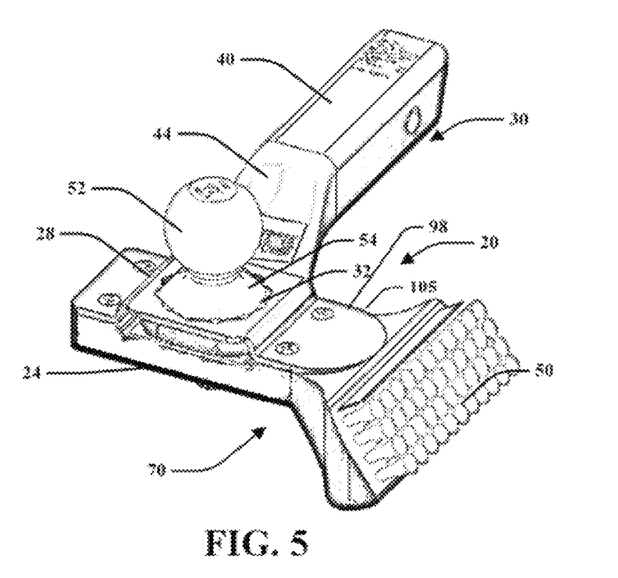
FIG. 5 is a perspective view of embodiments of a hitch mount assembly with a brush selectively secured to a hitch ball receiver.
Figure 6:
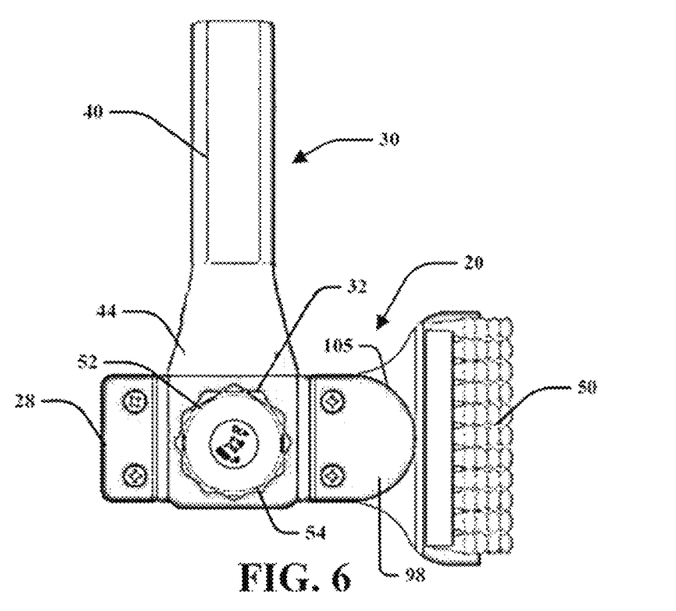
FIG. 6 is a top view the hitch mount assembly with the brush of FIG. 5.
Figure 7:
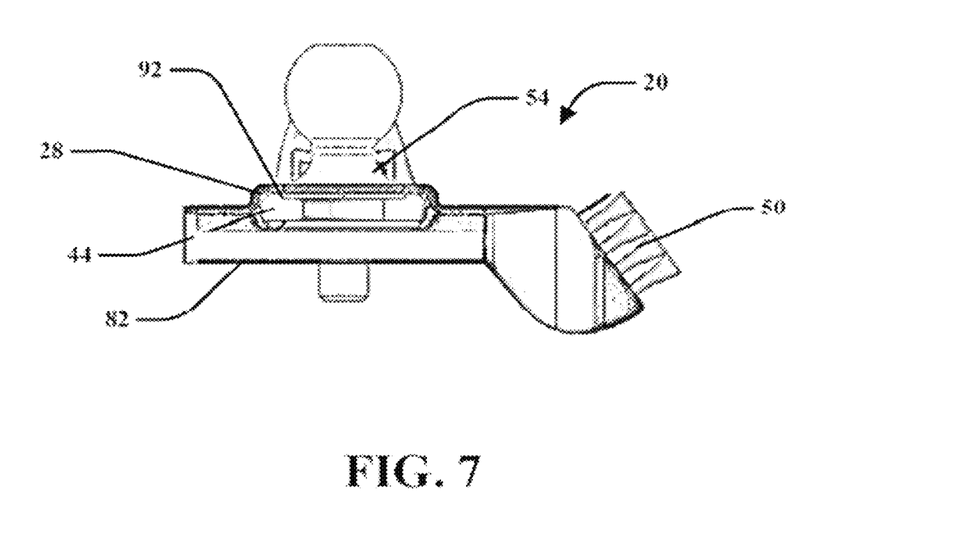
FIG. 7 is an front view the hitch mount assembly with the brush of FIG. 5.
Figure 8:
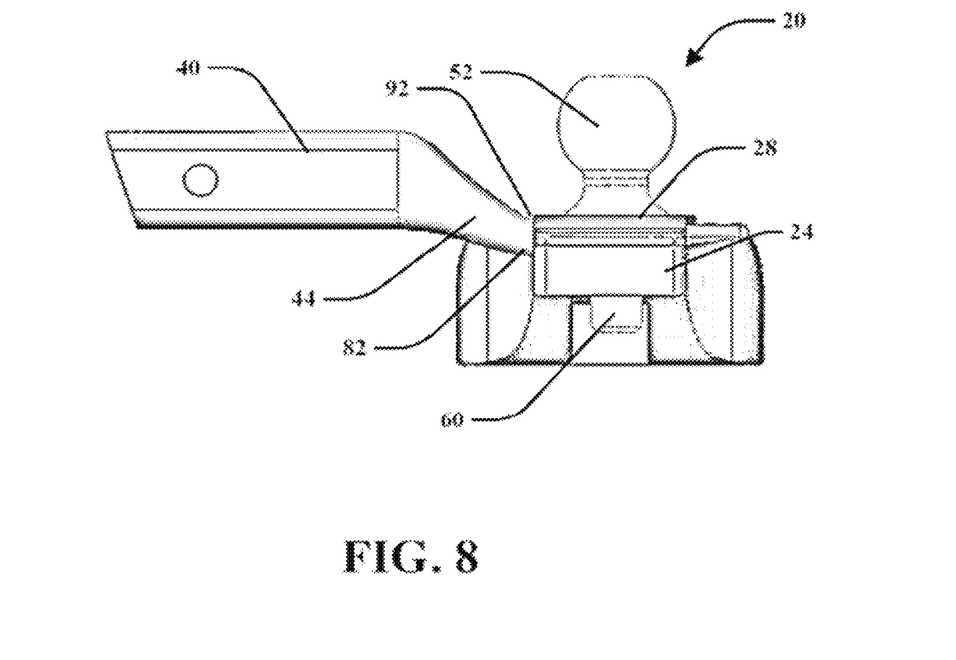
FIG. 8 is a first side view of the hitch mount assembly with the brush of FIG. 5.

In some embodiments, the mount body 24 may be selectively secured to the hitch ball receiver 30 through use of the top clamp 28. In these embodiments, the top clamp 28 may include an aperture 32, such as that shown in FIG. 4 by way of non-limiting example, which may be sized and shaped to generally allow the top clamp 28 to be positioned over the hitch ball 52 when the hitch ball 52 is attached to the tongue 44. The aperture 32 may be of a shape and size such that the top clamp 28 may be placed over the hitch ball 52 and engage or be in proximity to a top portion 92 of the tongue 44. Additionally, the aperture 32 may be shaped and sized to generally engage or be in close proximity to a base 54 of the hitch ball 52. By way of a non-limiting example, the aperture 32 may be of a generally hexagonal shape such that it generally matches a hexagonal shape of the base 54 of the hitch ball 52, an example of which is shown in FIGS. 5 and 6. While the shape of the aperture 32 and the base 54 may be generally the same, the present teachings are not limited to such. In other embodiments, the aperture 32 may be of a generally different shape than that of the base 94 of the hitch ball 52. For example, the aperture 32 may be of a generally hexagonal shape and the base 54 may be of a generally circular shape, or vice versa.

The top clamp 28 may be selectively secured to the mount body 24 such that the top clamp 28 and mount body 24 may generally clamp to the hitch ball receiver 30, or more specifically, the tongue 44. In some embodiments, at least one fastener 96 may selectively secure the top clamp 28 to the mount body 24. By way of a non-limiting example, four fasteners 96 may be utilized, but the present teachings are not limited to such. Any appropriate number of fasteners 96 may be utilized. In such embodiments, the mount body 24 may be positioned below the tongue 44 of the hitch ball receiver 30, as described above. The top clamp 28 may then be positioned over the tongue 44 of the hitch ball receiver 30, i.e., the top clamp 28 may be positioned over the hitch ball 52 such that the hitch ball 52 passes through the aperture 32 of the top clamp 28. The top clamp 28 may include a first attachment member 97 and a second attachment member 98 on each end of the top clamp 28. The attachment members 97, 98 may be shaped and sized to engage the second stepped portions 86 of the mount body 24 when the top clamp 28 is positioned over the hitch ball 52 and tongue 44 of the hitch ball receiver 30. The first attachment member 97 may have a different shape than the second attachment member 98. The first and second attachment members 97, 98 may generally create space between the top clamp 28 and mount body 24 so that the top clamp 28 and mount body 74 when selectively secured together may appropriately clamp on to the respective top portion 92 and underside 82 of tongue 44 of the hitch ball receiver 30. At least one of the first and second attachment members 97, 98 may extend past an edge of the mount body 24.

Figure 13:
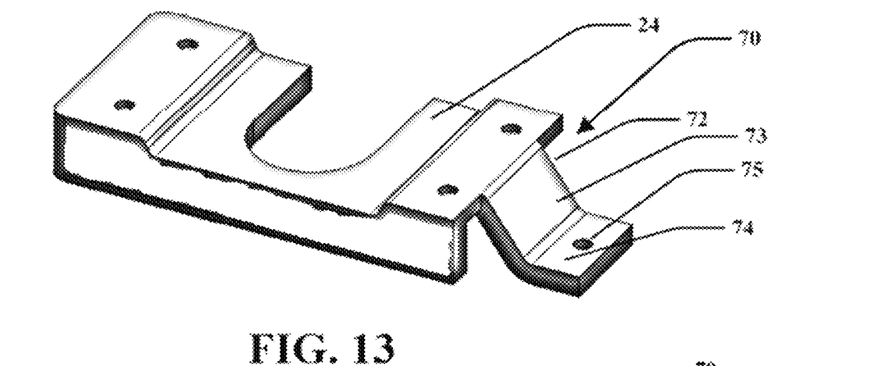
FIG. 13 is a perspective view of embodiments of a hitch mount assembly without an article mounted thereon in accordance with the instant disclosure.
Figure 14:
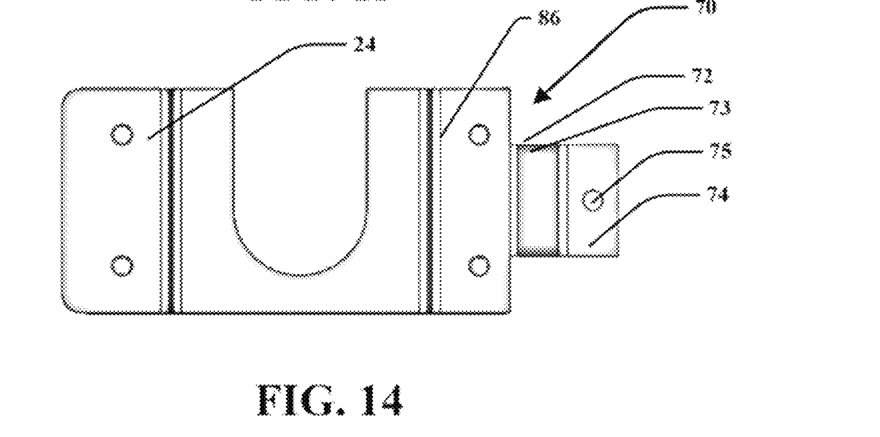
FIG. 14 is a top view the hitch mount assembly of FIG. 13.

As illustrated by FIGS. 13-15, the mount body 24 may include the attachment portion 70 to which one can selectively attach an article 50 thereto. The attachment portion 70 or feature may be axially aligned with the hitch ball receiver such that the article 50 may extend generally transvers (See FIG. 5 which illustrates the article about 90 degrees relative to the hitch ball receiver). The attachment portion 70 may include an attachment platform 72. The attachment platform may extend from a side of the mount body 24 adjacent to the second stepped portion 86. Additionally, the attachment platform 72 may include a ramped profile 73 and a flat profile 74 such that an aperture 75 is positioned thereon. The aperture 75 may be configured to receive a fastener therein to attach the article 50 to the platform 72. In one embodiment, the attachment platform 72 is configured to abut a complementary shaped surface 110 along a portion of the article 50. See FIGS. 16-19. The complementary shaped surface 110 may include a ramped profile 112 and a flat profile 114 to fittingly abut the ramped profile 73 and the flat profile 74 of the attachment platform 72. The article 50 may include an aperture 116 that aligns with the flat profile 114 such that when the attachment platform 72 abuts against the complementary shaped surface 110, the aperture 116 of the article 50 aligns with the aperture 75 on the attachment platform 72 to receive a fastener therein. Additionally, the article 50 may include first and second side walls 120, 122 that are positioned on either side of the complementary shaped surface 110. The first and second side walls 120, 122 may be aligned along either side of the attachment platform 72 as it abuts against the complementary surface 110. The first and second side walls 120, 122 may abut against an edge of the mount body 24 when the article 50 is attached to the attachment portion 70.

In one embodiment, the second attachment member 98 of the top clamp 28 may include an edge 105 having a shape that is configured to engage within a complementary shape of the article 50 to further secure the article 50 to the mount body 24 and top clamp 28. The article 50 may include a receiving profile 124 that is shaped in a complementary configuration as the shape of the edge 105 of the second attachment member 98. In one embodiment, the edge 105 includes a generally rounded configuration and the receiving profile 124 includes a generally rounded configuration. Additionally, the receiving profile may be positioned adjacent to the complementary shaped surface 110 and the aperture 116 on the article 50. Further, the receiving profile 124 may be adjacent to the first and second side walls 120, 124 such that as the edge 105 is receiving within the receiving profile 124, an underside of the second attachment member 89 abuts against top portions of the first and second side walls 122, 124. In this configuration, the attachment portion 70 may be configured to attach to the mount body 24 and top clamp 28 to the article 50 to prevent unwanted movement of the article relative to the mount body 24 or top clamp 28.

The top clamp 28 and mount body 24 being selectively secured together may generate sufficient clamping force to secure the hitch mount assembly 20 to the hitch ball receiver 30 without any additional engagement of features of the hitch mount assembly 20 and hitch ball receiver 30. By way of a non-limiting example, the clamping force may sufficient to make it unnecessary for the hitch mount assembly 20 to engage side portions of the hitch ball receiver 30, or more specifically, sidewalls of the tongue 44. Specifically, the clamping force applied by selectively securing the top clamp 28 and mount body 24 as described above may make it unnecessary for both of the top clamp 28 and the mount body 24 to engage sidewalls of the tongue 44 to secure the hitch mount assembly 20 to the hitch ball receiver 30. Alternatively, additional shims or fasteners may be added between the mount body 24 and the tongue 44 to frictionally abut against the tongue 44 for more support and to prevent unwanted movement. In some embodiments, the mount body 24 may include locating screws (not shown). The locating screws may extend from sides of the mount body 24 to secure the hitch mount assembly 20 to the hitch ball receiver 30 and may further appropriately position the mount body 24 relative to the hitch ball receiver 30. The locating screws may engage side apertures and may pass therethrough. Once the locating screws pass through the side apertures, the locating screws may engage side portions of the tongue 44.

In some embodiments, the mount body 24 may include a plurality of apertures 100 positioned on the second stepped portions 86, e.g., four apertures 100 may be positioned thereon. Similarly, the top clamp 28 may include a plurality of apertures, e.g., four apertures may be positioned on the first and second attachment members 97, 98 of the top clamp 28. The apertures of the mount body 24 and top clamp 28 may be generally alignable with each other such that the fasteners 96 may be inserted into and through the apertures when the first and second attachment members 97, 98 of the top clamp 28 are engaged with the second stepped portions 86 of the mount body 24. By way of a non-limiting example, the fastener 96 may include four bolts sized to engage the apertures such as four ¼ mounting bolts, four washers, such as ¼" flat washers and four nuts, such as ¼ lock-nuts.

The mount body 24, clamp body 28, and fasteners 96 may be made of any appropriate material. By way of a non-limiting example, the mount body 24 may be made of cast aluminum, the clamp body 28 may be made of alloy steel, and the fasteners 96 may be made of stainless steel. It should be understood, however, that the present teachings are not limited to these materials and that any the components may be made of any appropriate material.

The mount body 24 may optionally include an adapter 90, such as shown in FIGS. 1-3 and 20. The adapter 90 may generally fit over the hitch ball 52, or more specifically the base 54 of the hitch ball 52 and immediately below the top clamp 28. The adapter 90 may be used in some of embodiments of the mount body 24, but may not be required. The adapter 90 may be made of any appropriate material, including, without limitation, plastic, rubber, aluminum, steel or any combination of such materials. The adapter 90 may be used to selectively secure the mount body 24, or more specifically, the top clamp 28, around the hitch ball 52. In those embodiments, in which the top clamp 28 may not fit securely around the base 54 of the hitch ball 52, the adapter 90 may be used to create a more secure fit. The adapter 90 may be of a shape and size such that it fits around the base 54 of the hitch ball 52.

Figure 1:
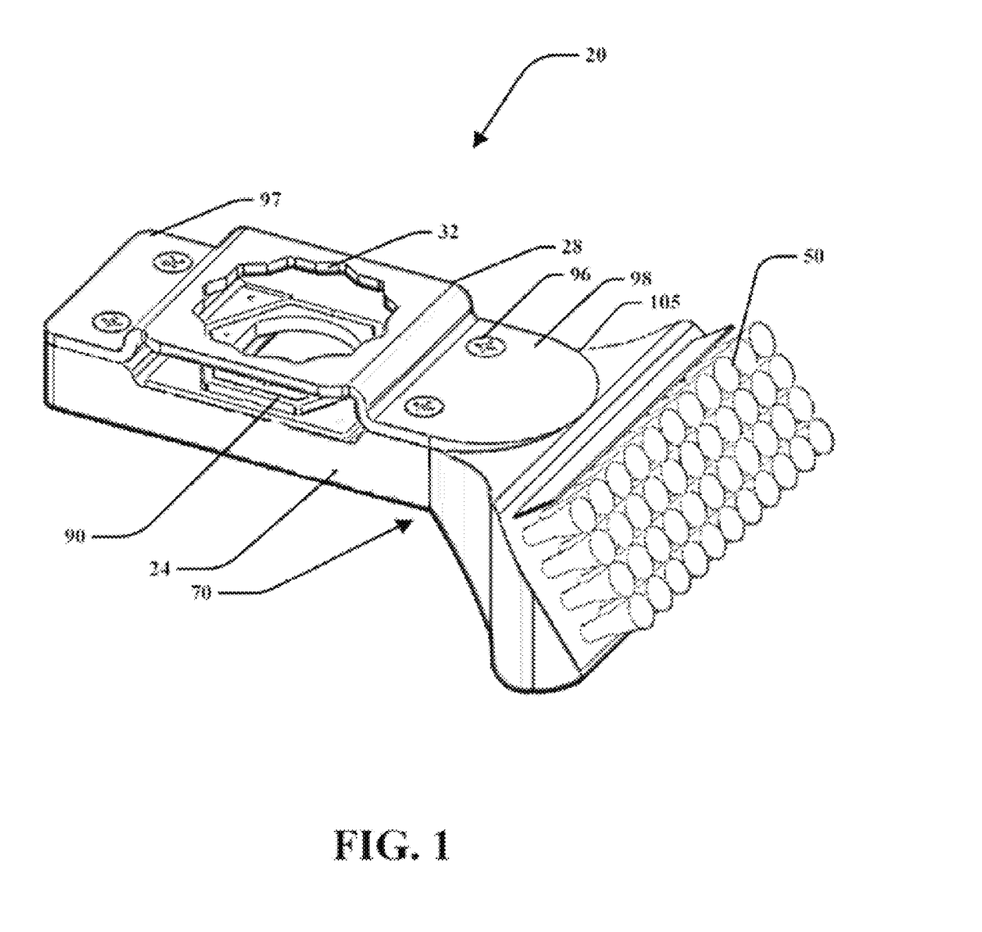
FIG. 1 is a perspective view of embodiments of a hitch mount assembly selectively secured to a brush in accordance with the instant disclosure.
Figure 2:
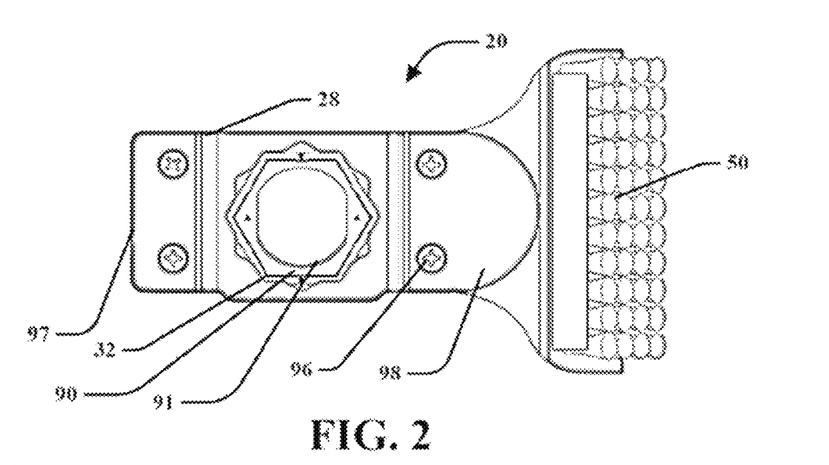
FIG. 2 is a top view the hitch mount assembly with the brush of FIG. 1.
Figure 3:
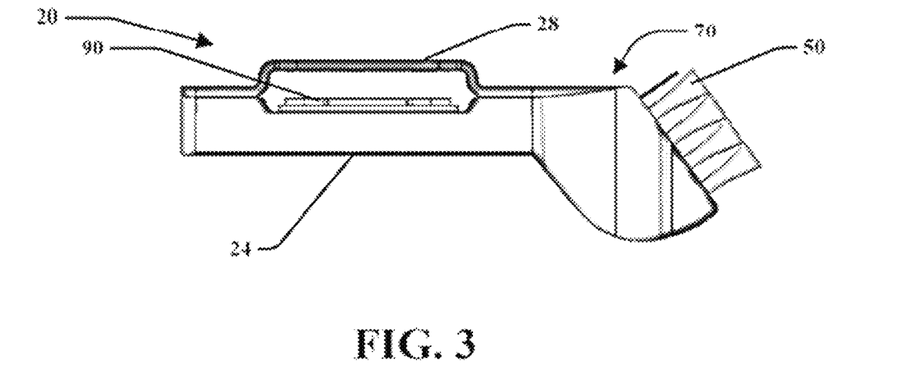
FIG. 3 is an front view the hitch mount assembly with the brush of FIG. 1.
Figure 4:
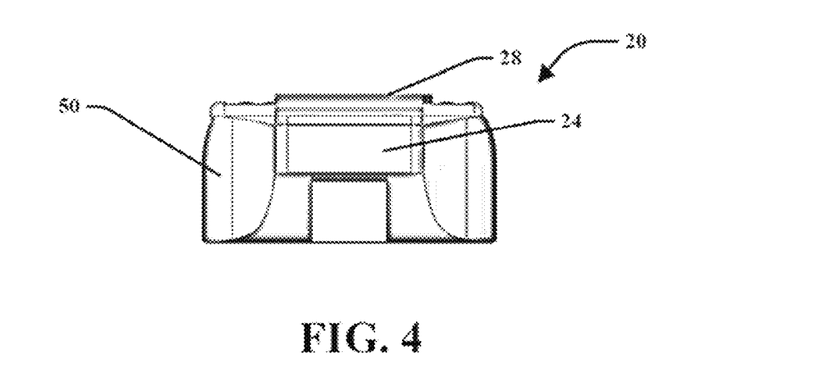
FIG. 4 is a first side view of the hitch mount assembly with the brush of FIG. 1.

As shown in FIG. 2, the adapter 90 may include an opening 91 of a predetermined shape. The shape of the opening 91 may include two generally semi-circular sections opposed one another with two flats generally opposed to one another. This shape opening 91 may be particularly useful with the base 54 of the hitch ball 52 is of a similar shape. In such embodiments, the opening 91 may generally match the shape of the base 54. This may permit the adapter 90 and top clamp 28 to securely attach with the hitch ball receiver 30.

Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application.

Figure 21:
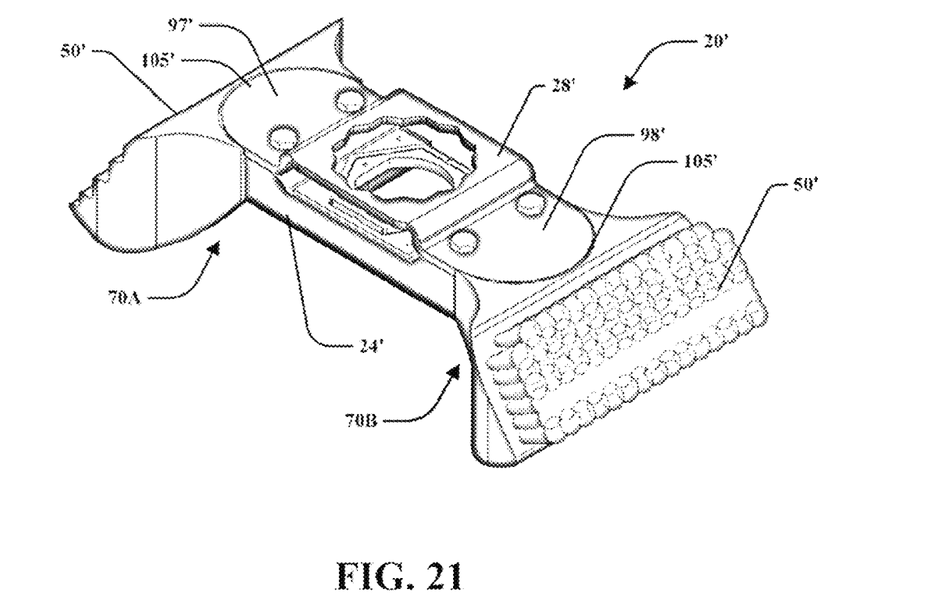
FIG. 21 is a perspective view of embodiments of a hitch mount assembly with a first article mounted on a first side and a second article mounted on a second side.
Figure 22:
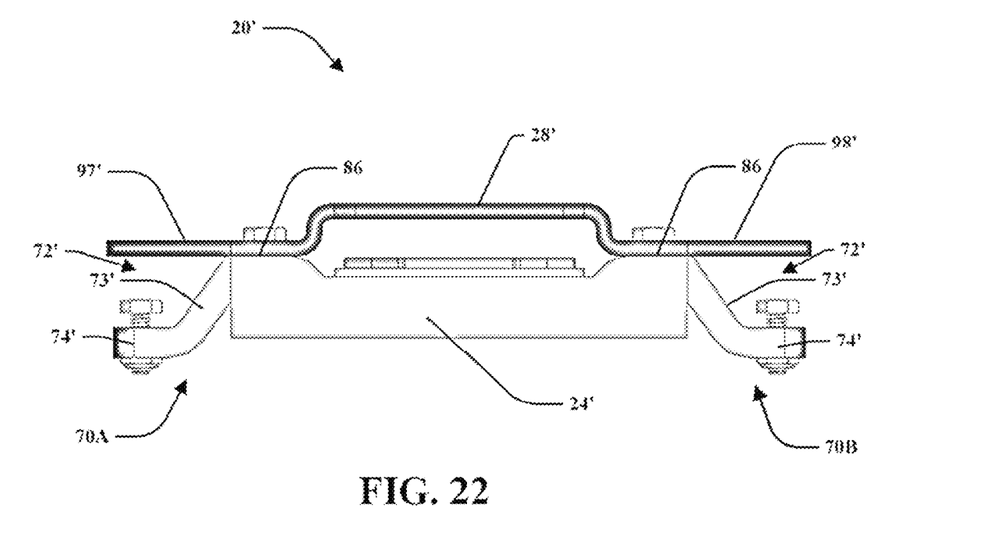
FIG. 22 is a front view of the hitch mount assembly of FIG. 21 without the articles mounted on the first side or the second side.

As illustrated by FIGS. 21 and 22, a hitch mount assembly 20' attachable to two objects 50' is provided. A mount body 24' is attached to a top clamp 28' having a first attachment member 97' and a second attachment member 98' on each end of the top clamp 28'. The attachment members 97', 98' may be shaped and sized to engage each of the second stepped portions 86' of the mount body 24' when the top clamp 28' is positioned over the hitch ball 52 and tongue 44 of the hitch ball receiver 30. In this embodiment, the first attachment member 97' may have a similar shape to the second attachment member 98'. The first and second attachment members 97', 98' may generally create space between the top clamp 28' and mount body 24' so that the top clamp 28' and mount body 74', when selectively secured together, may appropriately clamp on to the respective top portion 92 and underside 82 of the tongue 44 of the hitch ball receiver 30. The first and second attachment members 97', 98' may extend past the associated edges of the mount body 24'.

The hitch mount assembly 20' may include a first attachment portion 70A and a second attachment portion 70B along opposite ends of the mount body 24'. In one embodiment, the first and second attachment portions 70A, 70B are aligned with the aperture configured to receive the hitch ball 52 and extend transverse relative to the hitch ball 52 when the assembly 20' is attached thereto. The first attachment portion 70A and the second attachment portion 70B may be positioned along opposing edges of the mount body 24'.

Each attachment portion may be selectively attached to the articles 50'. The first and second attachment portions 70A, 70B may include an attachment platform 72'. The attachment platform may extend from the opposing sides of the mount body 24' adjacent to the second stepped portions 86'. Additionally, as similarly described above, the attachment platform 72' may include a ramped profile 73' and a flat profile 74' such that an aperture is positioned thereon. The aperture may be configured to receive a fastener therein to attach the article 50' to the platform 72'.

The first and second attachment members 97', 98' of the top clamp 28' may include an edge 105' having a shape that is configured to engage within a complementary shape of the article 50' to further secure the article 50' to the mount body 24' and top clamp 28'. FIG. 21 illustrates that the article 50' attached to the first attachment portion 70A is a scrape for footwear such as a boot or shoe while the article 50' attached to the second attachment portion 70B is a brush. The articles 50' may be various tools having various configurations and this disclosure is not limited as to the type, size, or configuration of the article that may be attached to the hitch mount assembly.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A hitch mount assembly selectively securable to a hitch ball receiver, the hitch mount assembly comprising:
   a mount body operatively engaged with a portion of the hitch ball receiver;
   a clamp body selectively secured to the mount body and positioned on a top portion of the associated hitch ball receiver;

at least one fastener selectively securing the clamp body to the mount body with the hitch ball receiver positioned between the clamp body and the mount body;

at least one attachment portion; and an article selectively attached with the at least one attachment portion, wherein the article is a boot brush.

2. The hitch mount assembly of claim 1, wherein the attachment portion transversely extends from one side of the mount body.

3. The hitch mount assembly of claim 1, wherein the mount body and the clamp body operatively clamp the underside portion and top side portion, respectively, of the associated hitch ball receiver securing the mount body and clamp body to the hitch ball receiver.

4. The hitch mount assembly of claim 3, wherein the attachment portion includes an edge of the clamp body that extends passed an edge of the mount body, the edge is received in a receiving profile on the article.

5. The hitch mount assembly of claim 1, further comprising an aperture in the clamp body, the aperture allowing a hitch ball to be passed therethrough.

6. The hitch mount assembly of claim 1, wherein the attachment portion includes an attachment platform that extends from an edge of the mount body, the attachment platform abuts against a surface on the article.

7. The hitch mount assembly of claim 6, wherein the attachment platform includes a ramp profile and a flat profile aligned with a complementary ramp profile and a flat profile of the surface on the article.

8. A hitch mount assembly selectively securable to a hitch receiver having a tongue, the hitch mount assembly comprising:

a mount body capable of circumscribing at least a portion of the tongue of the hitch receiver;

a clamp body selectively secured to the mount body and capable of being positioned over the tongue of the hitch ball receiver;

at least one fastener selectively securing the clamp body to the mount body;

at least one attachment portion extending from the mount body; and an article selectively attached with the at least one attachment portion.

9. The hitch mount assembly of claim 8, wherein the attachment portion includes an attachment platform that extends from an edge of the mount body.

10. The hitch mount assembly of claim 9, wherein the attachment platform includes a ramp profile and a flat profile aligned with a complementary ramp profile and a flat profile of a surface on the article.

11. The hitch mount assembly of claim 8, further comprising an aperture in the clamp body, the aperture allows a hitch ball to be passed therethrough.

12. The hitch mount assembly of claim 8, wherein the clamp body is attached to the mount body by a first and a second attachment member, at least one of the first and second attachment members extend passed an edge of the mount body.

13. The hitch mount assembly of claim 8, further comprising a first attachment portion and a second attachment portion positioned along opposing edges of the mount body.

14. The hitch mount assembly of claim 8, wherein the article is a brush.

15. A hitch mount assembly selectively securable to a hitch receiver, the hitch mount comprising:

a mount body operatively engaged with a portion of a hitch receiver;

a clamp body secured to the mount body;

at least one attachment portion; and an article selectively attached with the at least one attachment portion, wherein the at least one attachment portion selectively attaches the article with at least one of the clamp body and mount body.

16. The hitch mount assembly of claim 15, wherein the attachment portion includes an attachment platform that extends from an edge of the mount body.

17. The hitch mount assembly of claim 15, wherein the clamp body is attached to the mount body by a first and a second attachment member, at least one of the first and second attachment member extends passed an edge of the mount body.

18. The hitch mount assembly of claim 15, wherein the article is a brush.

19. The hitch mount assembly of claim 15, further comprising a first attachment portion and a second attachment portion positioned along opposing edges of the mount body.

* * * * *